United States Patent [19]

Yoshida et al.

[11] 4,006,030

[45] Feb. 1, 1977

[54] METHOD OF PREVENTING DETERIORATION OF INORGANIC SUBSTRATE SURFACE

[75] Inventors: Akitoshi Yoshida; Koichiro Yanagida; Tadanobu Maruyama, all of Funabashi, Japan

[73] Assignee: Nissan Chemical Industries, Ltd., Tokyo, Japan

[22] Filed: July 8, 1975

[21] Appl. No.: 594,039

Related U.S. Application Data

[63] Continuation-in-part of Ser. No. 415,357, Nov. 13, 1973, abandoned.

[30] Foreign Application Priority Data

Nov. 21, 1972   Japan .......................... 47-117037

[52] U.S. Cl. ................................. 106/74; 106/12
[51] Int. Cl.² ..................................... C04B 41/22
[58] Field of Search ..... 106/12, 74, 287.9, 287.9 E; 428/540

[56] References Cited

UNITED STATES PATENTS

| 1,238,202 | 8/1917 | Schwerin ........................... 428/540 |
| 3,625,722 | 12/1971 | von Freyhold et al. ............. 106/74 |

Primary Examiner—J. Poer
Attorney, Agent, or Firm—Oblon, Fisher, Spivak, McClelland & Maier

[57] ABSTRACT

The surface of an inorganic substrate comprising cement, concrete, gypsum or mixtures thereof is treated with a silicate solution or a silica sol comprising a monovalent alkali metal containing component, an ammonium containing component and a silica containing component at a molar ratio of 1:1~10:4~5000 corresponding to $M_2O:[R_1R_2R_3R_4N]_2O: SiO_2$ wherein M is Li, K or Na; and $R_1$, $R_2$, $R_3$ and $R_4$ each represent a hydrocarbon group or an alkanol group. The underlying inorganic substrate thus has a modified surface layer thereon having a thickness of less than 50 mm, which functions to protect and prevent deterioration of the underlying surface of said inorganic substrate.

7 Claims, No Drawings

METHOD OF PREVENTING DETERIORATION OF INORGANIC SUBSTRATE SURFACE

CROSS-REFERENCE TO RELATED APPLICATIONS

This application is a continuation-in-part application of U.S. application Ser. No. 415,357, filed on Nov. 13, 1973, now abandoned.

BACKGROUND OF THE INVENTION

1. Field of the Invention

This invention relates to a method of preventing deterioration of surfaces of inorganic substrates comprising cement, concrete, gypsum or mixtures thereof. The method can be applied to the surfaces of different types of buildings and construction made with said inorganic substrates to achieve uniformly excellent results in effectively protecting said surfaces from deterioration due to exposure to the elements.

2. Description of the Prior Art

Heretofore, cement, concrete, gypsum, etc. have been widely used in various fields such as in construction of buildings and other structures. Especially, spray coating of cement by the lithin process has been considered economical so that it has been subject to wide application in the outer surface finish coatings of concrete mortar. Since the thickness of a thus formed surface layer is thin, the unreacted calcium hydroxide component and the cement component have been found to deteriorate through a carbonation efflorescence so that the surface layer protection is progressively removed by a powdery deterioration within 1 or 2 years. Similar deterioration phenomena have been found to take place on processed surfaces of cement type mastic coats and gypsum coats. Cement type mastic coats have particular disadvantages in that cracking is common. Heretofore, no known attempt for preventing such deterioration has been successful.

SUMMARY OF THE INVENTION

It is an object of this invention to provide a method to prevent deterioration of inorganic substrate surfaces so as to maintain high strength, hardness and durability over long periods of time by coating or impregnating with a specific silica sol or silicate solution, the surfaces of cured inorganic substrates.

This object and other objects as will hereinafter become more readily apparent have now been attained by coating or impregnating with a silica sol or a silicate solution comprising a monovalent alkali metal containing component, an ammonium containing component and a silica containing component in a molar ratio of 1 : 1 10 : 4 5000 as $M_2O$ : $[R_1R_2R_3R_4N]_2O$:$SiO_2$ wherein M is Li, K or Na; and $R_1$, $R_2$, $R_3$ and $R_4$ are a hydrocarbon group or an alkanol group, wherein the silica sol or silicate solution is prepared by passing a solution of an alkali silicate through a cation exchange resin, surfaces of cured inorganic substrates, particularly cement, concrete, gypsum or mixtures thereof, so as to prevent deterioration of said surfaces.

DETAILED DESCRIPTION OF THE PREFERRED EMBODIMENTS

The silica sol or the silicate used in the invention is a special type comprising water or a hydrophilic organic solvent or a mixture thereof as a dispersing medium and further containing a dissociated or non-dissociated monovalent alkali metal ion; a dissociated or non-dissociated ammonium ion; and a colloidal silica or a silicate ion in a specific molar ratio. Specific silica sols and silicates will be disclosed hereinbelow. To prepare a stable silicate solution or silica sol, a medium such as water, methanol, ethanol, isopropanol, ethyleneglycol, propyleneglycol, acetone, dimethylformamide, tetrahydrofuran or mixtures thereof, can be employed.

The silicate solution or the silica sol used in the invention can be obtained by passing a solution of an alkali silicate in said medium through an cationic ion exchange resin. It is preferable in practice to use a transparent silica sol having a particle diameter of less than 5 m$\mu$ or a transparent silicate solution or a translucent colloidal silica sol having a particle diameter of 5 - 300 m$\mu$. When the silica sol contains larger particle diameters, the silica sol will not permeate readily into the fine structure of the surface layer by coating or impregnation into the inorganic substrate. Moreover, the surface activity of the silica sol will be too low to affect the surface of the inorganic substrate. The intended purpose of preventing deterioration of said surface cannot thus be attained.

An alkali metal ion of silica sol or silicate is usually a monovalent alkali metal ion, such as Li, K, Na, and is in a dissociated free form, or is bonded onto the surface of the silica sol or in the form of a salt of silicic acid.

The silica sol or silicate solution, for purposes of the invention, can be used without an ammonium containing component. However, when an ammonium containing component is added, the ammonium ion will become bonded onto the surface of the silica sol or it will be in the form of a dissociated free form or a salt of silicic acid, whereby the stability of the silica sol will be improved and the resulting sol will have a high level of surface activity. It is thus remarkably effective for preventing deterioration of the inorganic surfaces. Suitable such ammonium components include the primary amines, e.g., methyl amine, ethyl amine or the like; the secondary amines, e.g., dimethyl amine, diisopropyl amine or the like; the tertiary amines, e.g., trimethyl amine or the like; the quaternary ammonium bases, which are included within the formula:

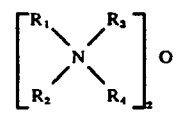

wherein $R_1$, $R_2$, $R_3$ and $R_4$ are as previously defined. A suitable quaternary ammonia base is tetraethanol ammonium hydroxide. Mixtures of these ammonium components can also be used. The silicate solution or the silica sol used in the method of the invention comprises a monovalent alkali metal containing component, an ammonium containing component and the silica containing component in a molar ratio of 1 : 1~10:4~5000 as $M_2O$: $[R_1R_2R_3R_4N]_2O$:$SiO_2$ as defined above. Deterioration of the surfaces of the cured inorganic substrates, particularly cement, concrete, gypsum or mixtures thereof can thus be prevented by coating or impregnation with silicate solutions or silica sols.

When a molar ratio of the ammonium containing component to the monovalent alkali metal containing component is greater than 10, the desired hardening or strengthening effect on the surface of the inorganic substrate treated with the silicate solution or the silica sol cannot be achieved. Moreover, the time necessary for curing the surface is disadvantageously long. When the molar ratio of the silica containing component to the monovalent alkali metal containing component is less than 4, a uniform and sufficiently hard surface will not be attainable when treating the surfaces of inorganic substrates with the silicate solution or the silica sol.

Although higher molar ratios of the silica containing components to the monovalent alkali metal containing components are preferable, it is difficult to readily prepare a silica sol having a molar ratio greater than 5000 of the silica containing component to the alkali metal containing component. When a hydrolytic solution of ethyl silicate having a molar ratio of the silica content to the alkali metal content greater than 5000 is applied to the inorganic substrate, for the treatment of a cured surface, the hydrophobic properties will be too high to effectively modify the surface treated. The optimum molar ratio of the silica containing component to the alkali metal containing component is within the range of 4 – 5000.

The method of this invention for preventing deterioration of cured surfaces of the inorganic substrate, functions not only to mechanically cover and protect the surfaces of the inorganic substrates from exterior deterioration factors, such as air, light, rain, or the like, but further in reacting the silica containing component in the silicate solution or the silica sol with the inorganic substrate at the surface to a thickness of about 50 mm so as to form a layer having great hardness. The desired results obtained are indicated by the excellent deterioration resistance of the resulting modified surface. However, it is difficult to obtain the desired effects of the invention by admixing the silicate solution or the silica sol with the inorganic raw materials since it is difficult to selectively form the desired modified layer in high concentration on the cured surface.

The desired effect in preventing the deterioration of the surface of an inorganic substrate can be achieved by coating or impregnating the silicate solution or the silica sol on the surface of inorganic substrate, if the latter does not contain the silicate solution or the silica sol. The effect of the surface treatment is to produce a surface layer of a thickness of about 50 mm. However, a degree of modification at the surface of the substrate to produce a layer having a thickness of less than 50 mm, especially less than 20 mm, is most desirable. The degree of modification decreases in the direction of the internal areas of the substrate.

Accordingly, the method of the invention is to modify the inorganic substrate surface, to produce a protective layer preferably of a thickness of less than 50 mm and especially less than 20 mm. The method of the invention is especially effective for preventing deterioration of the surface of a cement sprayed lithin surface, a cement mastic coated surface or a bare concrete surface. The method can also be applied to the surfaces of cured inorganic substances such as plastic containing cement, plastic containing gypsum, gypsum plaster, mortar, or the like. In some cases, it is possible to apply silicate solutions and silica sols which also contain a pigment, a filler, a water-repelling agent, a dispersing agent, a viscosity improver, a surfactant, or the like, in suitable proportion. The coating or impregnation can be attained by brushing, spray coating, roller coating, curtain flow coating, or the like.

Deterioration of a lithin layer by carbonation can be prevented by spraying the silicate solution or the silica sol onto the cement sprayed lithin surface during a period of time from just after the lithin surface is formed to several months later.

The hardness and gloss of the surface are improved by coating the silicate solution onto a cement mastic coat surface so as to provide a $SiO_2$ content of greater than 5 weight percent after drying.

Bare concrete surfaces are usually stained with acid, retarder, or the like, so that the surface strength is weaker than that of internal areas. However, when bare concrete surfaces are treated with the silicate solution, an improved adhesive effect between the aggregates and the cement is achieved, and the colloidal silica gel penetrates into the fine surface structure so as to form the modified surface, whereby the surface hardness can be increased and long term weather durability can be achieved.

When the method of the invention is applied to surfaces of gypsum substrates, the surface hardness is also increased and a surface having high water and heat resistance can be obtained by coating the silicate solution onto a surface which has just been cured. An object of the method of the invention is thus to attain a surface layer of cured inorganic substrate.

When the thickness of the layer is less than 50 mm and more especially, less than 20 mm, the desired effects in preventing deterioration obtained by the modification of the surface layer are remarkably good and uniformly excellent results are obtained. Especially provided by the method of this invention, are surfaces having excellent deterioration resistance, for a cement sprayed with a lithin layer or a mastic coat layer having a thickness of 0.2 - 5 mm.

Having generally described the invention, a further understanding can be obtained by certain specific examples which are provided herein for purpose of illustration only and are not intended to be limiting in any manner. In the examples, the term of part designates part by weight.

EXAMPLE 1

A lithin coated surface was prepared by spraying a cement lithin on a surface of concrete to a thickness of 2.5 mm and maintaining it at room temperature in normal atmosphere for 3 hours. The surface was then treated by spraying it with a composition comprising an aqueous silica sol having a particle diameter of 22 m$\mu$ which comprises a $SiO_2$ component of 35% by weight at a molar ratio of $Na_2O:SiO_2$ of 1:120 and a viscosity improver which is methyl cellulose of 0.5% by weight, under a pressure of 0.3 kg/m$^2$ from a spray gun.

The product was kept at a room temperature in normal atmosphere for 6 days so as to allow the cement lithin processed surface (A) coated with the silica sol to form.

REFERENCE 1

In accordance with Example 1, a lithin coated surface was prepared and after 3 hours, the surface was treated by a composition of an aqueous solution of sodium silicate containing an $SO_2$ component of 25% by weight at a molar ratio of $Na_2O:SiO_2$ of 1:3 and a viscosity improver which is methyl cellulose of 0.5% by weight, in accordance with Example 1.

The product was kept at room temperature in normal atmosphere for 6 days so as to form a cement lithin processed surface (B) as the reference.

EXAMPLE 2

On a bare concrete surface, a cement type mastic composition comprising a cement, an acrylic resin, a ferric oxide pigment and water, was coated to a thickness of 5 mm with a roller. After 7 days, an aqueous solution of tetraethanol ammonium lithium silicate comprising an $SO_2$ component of 12% by weight at a molar ratio of $Li_2O:[(C_2H_4OH)_4N]_2O: SiO_2$ of 1:2:20, under a pressure of 0.7 kg/m² was applied from a spray gun.

The product was kept at room temperature in normal atmosphere for one day so as to form a cement type mastic coated surface (C) coated with the silicate solution.

In accordance with the accelerated weather durability test of JISK5400 (1970), the weather durability of the treated surfaces (A), (B) and (C) and an untreated surface (D) (the cement lithin coated surface kept at room temperature for 6 days in normal atmosphere) were tested. The hardness of the surfaces was measured by a pencil method. The results of the tests are shown in Table I.

TABLE I

| Surface | Weather durability test (days) | | | |
|---|---|---|---|---|
| | 0 | 20 days | 30 days | 50 days |
| Example 1 (A) | 7H | 8H | 9H < | higher than 9H |
| Example 2 (C) | 3H | 8H | 8H | 9H < |
| Reference 1 (B) | 5H | 2H | HB | B |
| Untreated (D) | 3H | H | HB | B |

As shown in Table 1, the surfaces prepared by Examples 1 and 2 of the invention had remarkably high weather durability compared with the surfaces prepared by Reference 1 and the untreated surface. The surfaces prepared by Examples 1 and 2 had gloss and hardness comparable to a porcelain.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A method of preventing deterioration of an inorganic substrate surface which comprises coating or impregnating the surface thereof with a silicate solution or a silica sol having a particle diameter of 5-300 m$\mu$ and comprising a monovalent alkali metal component, an ammonium component and a silica component at a molar ratio of 1 : 1~10 : 4~5000 corresponding to $M_2O: [R_1R_2R_3R_4N]_2O : SiO_2$ wherein M is Li, K or Na; and $R_1$, $R_2$, $R_3$ and $R_4$ each represent a hydrocarbon group or an alkanol group and the silicate solution or the silica sol is prepared by passing a solution of an alkali silicate through a cation exchange resin.

2. The method of claim 1, wherein to the silicate solution or the silica sol there is added an ammonium component selected from the group consisting of primary amines, secondary amines, tertiary amines, and quaternary ammonium bases.

3. The method of claim 1, wherein the inorganic substrate is a cement, a concrete, gypsum or mixtures thereof.

4. The method of claim 1, wherein the silicate solution or the silica sol is impregnated to a thickness of up to 50 mm.

5. The method of claim 1, wherein the silicate solution or the silica sol is coated onto the surface of a cured inorganic substrate.

6. The method of claim 1, wherein the silicate solution or a silica sol is prepared in a medium of water, methanol, ethanol, isopropanol, ethyleneglycol, propyleneglycol, acetone, dimethyl formamide, tetrahydrofuran or mixtures thereof.

7. In the process of claim 1, the silica sol or silicate containing methyl amine, ethyl amine, dimethyl amine, diisopropyl amine, trimethylamine, tetraethanol ammonium hydroxide or mixtures thereof is added as the ammonium component.

* * * * *